United States Patent [19]

Amundson, Jr. et al.

[11] Patent Number: 4,977,110
[45] Date of Patent: Dec. 11, 1990

[54] BEIGE-TINTED GLASS-CERAMICS

[75] Inventors: W. Duane Amundson, Jr., Caton; Heather Boek, Painted Post; George B. Hares, Corning; Robert W. Pfitzenmaier, Canisteo, all of N.Y.

[73] Assignee: Corning Incorporated, Corning, N.Y.

[21] Appl. No.: 464,372

[22] Filed: Jan. 12, 1990

[51] Int. Cl.⁵ .............................................. C03C 10/12
[52] U.S. Cl. ............................................ 501/7; 501/57; 501/64
[58] Field of Search ................. 501/7, 64, 57

[56] References Cited

U.S. PATENT DOCUMENTS 3,157,522 11/1964 Stookey ................................... 501/7
3,788,865 1/1974 Babcock et al. ........................ 501/7
4,331,769 5/1982 Danielson et al. ..................... 501/59
4,461,839 7/1984 Rittler ..................................... 501/7
4,786,617 11/1988 Andrien et al. ........................ 501/3

Primary Examiner—Mark L. Bell
Attorney, Agent, or Firm—Clinton S. Janes, Jr.

[57] ABSTRACT

This invention relates to the production of opaque, beige-tinted glass-ceramic articles consisting essentially, in weight percent, of

| | | | |
|---|---|---|---|
| $SiO_2$ | 66–70 | $TiO_2$ | 3.5–5.5 |
| $Al_2O_3$ | 16.5–19.5 | $CeO_2$ | 1.5–2.75 |
| $Li_2O$ | 2–4 | $As_2O_3$ | 0–1.5 |
| $MgO$ | 1–5 | $F$ | 0–1.2 |
| $ZnO$ | 0.5–2 | $ZrO_2$ | 0–2.5 |
| $Na_2O$ | 0–1 | | |

2 Claims, 1 Drawing Sheet

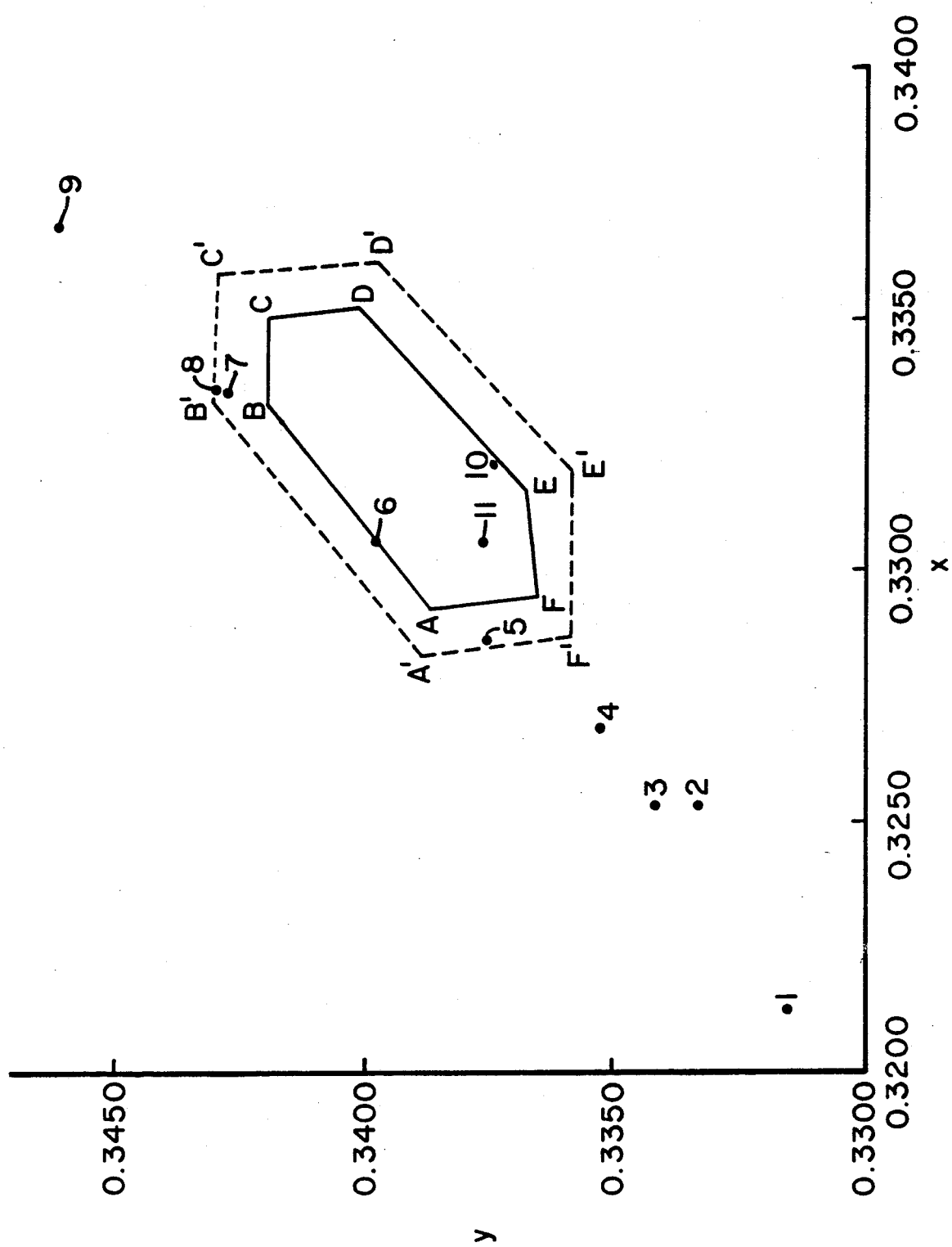

BEIGE-TINTED GLASS-CERAMICS

BACKGROUND OF THE INVENTION

This invention relates to the fabrication of opaque glass-ceramic articles exhibiting an integral beige tint which are eminently useful as culinary ware.

As is well-recognized in the art, glass-ceramic articles are produced through the controlled crystallization of precursor glass articles, the process of manufacture normally consisting of three basic steps: first, a glass forming batch typically containing a nucleating agent is melted; second, that melt is cooled to a temperature below the transformation range thereof and simultaneously shaped into a glass body of a desired configuration; and third, that glass body is exposed to a heat treatment designed to effect the in situ growth of crystals within the glass body. (As is commonly used in the art, the transformation range is defined as the temperature at which a molten material is transformed into an amorphous mass, that temperature being deemed to reside in the vicinity of the annealing point of a glass.)

Quite frequently, the thermally-induced crystallization in situ will be carried out in two general steps: first, the precursor glass body will be heated to a temperature slightly above the transformation range for a period of time sufficient to generate nuclei therein; and second, the nucleated glass is heated to a temperature approaching, and often surpassing, the softening point of the glass to cause the growth of crystals on the nuclei. This two-stage heat treatment commonly yields glass-ceramic articles containing higher levels of crystallization with more uniformly-sized, fine-grained crystals. It will be appreciated that, as the temperature of the nucleated precursor glass article approaches the softening point of the glass, the rate at which the temperature is raised must be regulated to allow time for the sufficient growth of crystallization to resist thermal deformation of the body. Thus, the crystals developed during the heat treatment process are most usually more refractory than the precursor glass, and thereby can provide a structure demonstrating resistance to thermal deformation at temperatures higher than those at which the precursor glass can be subjected. Also, because the crystal forming components will have been removed therefrom, the small percentage of residual glass remaining in the glass-ceramic (customarily less than 50% by volume and frequently less than 10% by volume) will have a very different composition from that of the precursor glass, and most often that residual glass will manifest a higher softening point than that of the precursor glass.

The development of a high concentration of crystals within a glass-ceramic body has a further advantage vis-vis/ the precursor glass body in dramatically enhancing the mechanical strength thereof, usually by a factor of at least two and frequently as much as three times that of the precursor glass. That significant improvement in mechanical strength, coupled with their substantially higher use temperatures and their intrinsic "porcelain-like" appearance, have led to the widespread use of glass-ceramic articles as culinary ware.

Generally, in the absence of added colorants, opaque glass-ceramic articles display a white appearance. For example, Corning Code 9608 glass-ceramic, marketed by Corning Incorporated, Corning, N.Y. for over 30 years under the trademark CORNING WARE®, exhibits a creamy white appearance. Having a composition included within U.S. Pat. No. 3,157,522, that opaque glass-ceramic contains a crystallinity in excess of 90% by volume wherein betaspodumene solid solution constitutes the predominant crystal phase with a minor amount of spinel and rutile also being present. Corning Code 9608 has the following approximate analysis, expressed in terms of weight percent on the oxide basis:

| $SiO_2$ | 69.5 | ZnO | 1.0 | F | 0.03 |
|---|---|---|---|---|---|
| $Al_2O_3$ | 17.7 | $TiO_2$ | 4.7 | $Fe_2O_3$ | 0.05 |
| $Li_2O$ | 2.7 | $ZrO_2$ | 0.2 | $B_2O_3$ | 0.07 |
| MgO | 2.6 | $As_2O_3$ | 0.6 | $MnO_2$ | 0.03 |

As might well be expected, colorants known in the glass art have been incorporated into precursor glass compositions which have subsequently been crystallized in situ to glass-ceramic articles. U.S. Pat. No. 4,461,839 (Rittler) and U.S. Pat. No. 4,786,617 (Andrieu et al.) are recent illustrations of that practice.

The former patent discloses the manufacture of opaque glass-ceramic articles containing β-spodumene solid solution as the predominant crystal phase, which can display colors ranging from gray to brown to almond to beige to yellow to blue, that are prepared from precursor glass articles having base compositions essentially free from MgO and consist essentially, in weight percent, of:

| $SiO_2$ | 63.5–69 | BaO | 0–5 |
|---|---|---|---|
| $Al_2O_3$ | 15–25 | $TiO_2$ | 2–3 |
| $Li_2O$ | 2.5–4 | $ZrO_2$ | 0.5–2.5 |
| $Na_2O$ | 0.1–0.6 | $As_2O_3$ | 0.4–0.8 |
| $K_2O$ | 0.1–0.6 | $Fe_2O_3$ | 0.05–0.1 |
| ZnO | 0–2 | | |

The desired colors are obtained through the use of a "color package" containing about 0.5–3% $TiO_2$ and up to 0.15% $Fe_2O_3$ with 0.3–3% total of at least two oxides in the indicated proportion selected from the group of up to 0.3% $V_2O_5$, up to 3% $CeO_2$, up to 2% CaO, up to 1% NiO, up to 1% $WO_3$, and up to 1.5% $SnO_2$. The total $TiO_2$ content in the glass will range > 2.5–6% and that of the $Fe_2O_3$ content will range 0.05–0.2%.

The latter patent describes the fabrication of opaque glass-ceramic articles containing potassium fluorrichterite and/or a related fluormica as the predominant crystal phase(s) from precursor glass compositions essentially free from $Li_2O$ and which consist essentially, in weight percent, of:

| $SiO_2$ | 61–70 | $K_2O$ | 2.5–5.5 |
|---|---|---|---|
| $Al_2O_3$ | 2.75–7 | $Na_2O + K_2O$ | <6.8 |
| MgO | 11–16 | F | 2–3.25 |
| CaO | 4.75–9 | BaO | 0–3.5 |
| $Na_2O$ | 0.5–3 | $P_2O_5$ | 0–2.5 |

The text of the patent noted that it was possible to incorporate such conventional glass colorants as $Fe_2O_3$, $CeO_2$, CaO, $Cr_2O_3$, CuO, $MnO_2$, $Na_2O$, and $V_2O_5$ into the base precursor glass composition in amounts typically less than 1% total. Nevertheless, only the use of $Fe_2O_3$ to impart a yellow tint to the glass-ceramic was expressly mentioned.

Corning Incorporated currently markets a line of opal glass tableware under the trademark CORNERSTONE®. *That product has a composition included in U.S. Pat. No.*

4,331,769 (Danielson et al.) and exhibits a beige tint defined within the polygon bounded by Points ABC-DEFA depicted in the appended drawing, which polygon encompasses a plot of the x and y chromaticity coordinates (Illuminant C). The visual appearance of the product is described here in accordance with the standard CIE system utilizing chromaticity coordinates x and y and the tristimulus value Y. Thus, the values are measured under standard conditions, i.e., Illuminant C, with a Hunter Colorimeter and represent the light that diffusely reflects off opaque surfaces. Because the values obtained are readily reproducible, they are commonly employed to facilitate comparisons and to delimit specifications.

The tint is imparted to the CORNERSTONE® tableware through the incorporation of NiO into the base glass compositions. The research leading to the present invention had as its goal the development of an opaque glass-ceramic body demonstrating properties suitable for use as cookware which would exhibit a hue close to and compatible with that of CORNERSTONE® tableware, thereby offering to the consumer maket a complete line of dinnerware and cookware of approximately the same tint. Because the glass-ceramics were destined for use as culinary ware, the chemical and physical properties recognized in the art as being necessary in such articles would likewise be required in the tinted articles. For example, the tinted articles would exhibit low linear coefficients of thermal expansion, viz., <15 and preferably <$13 \times 10^{-7}$/°C. over the temperature range of 0°–300° C., and good resistance to the chemical attack of food products.

SUMMARY OF THE INVENTION

In view of the fact that Corning Code 9608 was known to manifest the chemical and physical properties to perform well as cookware, additions of known coloring agents, both individually and in various combinations, were made to the base precursor or glass composition therefor in attempts to substantially duplicate the hue of CORNERSTONE® tableware. As a result of those testing experiments, we discovered a very narrow range of precursor base glass compositions containing about 1.5–2.75% $CeO_2$ as the colorant which could be heat treated to form opaque glass-ceramic articles demonstrating the chemical and physical properties required in glass-ceramics devised for use as culinary ware, and which also display a beige tint close to and compatible with that of CORNERSTONE® tableware. (The incorporation of NiO in the precursor base glass composition of Corning Code 9608 imparts a blue coloration to the glass-ceramic.) Those glass compositions consist essentially, expressed in terms of weight percent on the oxide basis, of

| $SiO_2$ | 66–70 | $TiO_2$ | 3.5–5.5 |
| $Al_2O_3$ | 16.5–19.5 | $CeO_2$ | 1.5–2.75 |
| $Li_2O$ | 2–4 | $As_2O_3$ | 0–1.5 |
| MgO | 1–5 | F | 0–1.2 |
| ZnO | 0.5–2 | $ZrO_2$ | 0–2.5 |
| $Na_2O$ | 0–1 | | |

In like manner to conventional glass-ceramics known to the art, the products of the present invention are prepared in accordance with the following three general steps:

(a) a batch for a glass having a composition within the above ranges is melted;

(b) that melt is cooled to a temperature below the transformation range thereof and simultaneously a glass body of a desired configuration is shaped therefrom; and (c) the glass body is heat treated in a manner to effect the crystallization in situ thereof.

To assure the development of a highly crystalline article wherein the crystals are uniformly fine-grained, the precursor glass body will be nucleated via exposure for a sufficient period of time to a temperature within the range of about 750°–850°C., and thereafter will be crystallized via exposure for a sufficient period of time to a temperature within the range of about 1025°–1175°C. Whereas an express dwell period within either of those temperature ranges may be used as a matter of convenience, such is not required. It is only necessary that the glass article be within those ranges for a sufficient length of time to accomplish the purpose therefor. As can be appreciated, the time required is dependent in some measure upon the thickness of the glass articles being heat treated to assure temperature equilibration throughout the body thereof.

The inventive glass-ceramics are very highly crystalline, i.e., greater than 75% by volume crystalline and, more desirably, greater than 90% by volume crystalline. The crystals, themselves, are quite uniformly fine-grained, with diameters of less than 1 micron. $\beta$-spodumene solid solution (s.s.) constitutes by far the predominant crystal phase with minor levels of spinel and rutile. The cerium-containing minerals loparite ($Ce_2Ti_3O_{8.7}$) and perrierite ($Ce_2Ti_2Si_2O_{11}$) have also been identified via x-ray diffractometry as being present in small amounts.

In summary, to achieve the beige tint displayed by CORNERSTONE® dinnerware, the above-recited composition intervals for the inventive glass-ceramics must be very closely observed. Moreover, care must also be observed in the crystallization heat treatment applied to the inventive precursor glass articles, as will be illustrated hereinafter.

BRIEF DESCRIPTION OF THE DRAWING

The drawing depicts two polygons encompassing plots of reflectance chromaticity coordinates x and y (Illuminant C) measured on CORNERSTONE® tableware and articles of the present invention.

DESCRIPTION OF PREFERRED EMBODIMENTS

Table I below lists several precursor glass compositions, expressed in terms of parts by weight on the oxide basis as calculated from the batch, capable of being crystallized in situ to yield opaque glass-ceramic articles, which compositions illustrate the composition parameters of the present invention. Inasmuch as the sum of the individual components closely approximates 100, for all practical purposes the values recorded may be deemed to represent weight percent. Because it is not known with which cation(s) the fluoride is combined, and the amount present to act as a melting aid and as a strengthening agent as disclosed in U.S. Pat. No. 3,148,994 is small, it is merely reported as fluoride in accordance with conventional glass analysis practice. $Fe_2O_3$ was not intentionally included in the composition but is present therein as an impurity from the batch materials, particularly in the sand comprising the source of $SiO_2$. Because of its severe adverse effect upon color, $Fe_2O_3$ will preferably be essentially absent from the compositions and should be held below 0.05% by weight. The actual ingredients employed in preparing the glass forming batch may comprise any materials, either the oxides or other compounds, which, when melted together, will be converted into the desired oxide in the proper proportions. For example, petalite may be used to supply $Li_2O$, $Al_2O_3$, and $SiO_2$. Sodium silico-fluoride provided the source of fluoride in the two compositions tabulated below. Arsenic oxide was included to perform its conventional function as a fining agent.

TABLE I

|  | 1 | 2 | 3 | 4 | 5 | 6 |
|---|---|---|---|---|---|---|
| $SiO_2$ | 69.60 | 69.35 | 69.10 | 68.85 | 68.60 | 68.35 |
| $Al_2O_3$ | 17.83 | 17.83 | 17.83 | 17.83 | 17.83 | 17.83 |
| $TiO_2$ | 4.70 | 4.70 | 4.70 | 4.70 | 4.70 | 4.70 |
| $Li_2O$ | 2.70 | 2.70 | 2.70 | 2.70 | 2.70 | 2.70 |
| MgO | 2.60 | 2.60 | 2.60 | 2.60 | 2.60 | 2.60 |
| ZnO | 1.04 | 1.04 | 1.04 | 1.04 | 1.04 | 1.04 |
| $As_2O_3$ | 0.52 | 0.52 | 0.52 | 0.52 | 0.52 | 0.52 |
| $Na_2O$ | 0.37 | 0.37 | 0.37 | 0.37 | 0.37 | 0.37 |
| F | 0.027 | 0.027 | 0.027 | 0.027 | 0.027 | 0.027 |
| $Fe_2O_3$ | 0.033 | 0.033 | 0.033 | 0.033 | 0.033 | 0.033 |
| $CeO_2$ | 0.50 | 0.75 | 1.00 | 1.25 | 1.50 | 1.75 |

|  | 7 | 8 | 9 | 10 | 11 |
|---|---|---|---|---|---|
| $SiO_2$ | 68.10 | 67.60 | 67.10 | 68.20 | 68.38 |
| $Al_2O_3$ | 17.83 | 17.83 | 17.83 | 18.80 | 17.84 |
| $TiO_2$ | 4.70 | 4.70 | 4.70 | 3.70 | 4.70 |
| $Li_2O$ | 2.70 | 2.70 | 2.70 | 2.90 | 2.70 |
| MgO | 2.60 | 2.60 | 2.60 | 2.20 | 2.60 |
| ZnO | 1.04 | 1.04 | 1.04 | 1.04 | 1.04 |
| $As_2O_3$ | 0.52 | 0.52 | 0.52 | 0.63 | 0.63 |
| $Na_2O$ | 0.37 | 0.37 | 0.37 | 0.37 | 0.37 |
| F | 0.027 | 0.027 | 0.027 | 0.03 | 0.027 |
| $ZrO_2$ | — | — | — | 0.10 | — |
| $Fe_2O_3$ | 0.033 | 0.033 | 0.033 | 0.048 | 0.048 |
| $CeO_2$ | 2.00 | 2.50 | 3.00 | 1.80 | 1.86 |

The batch ingredients were compounded, ballmilled together to assist in securing a homogeneous melt, and then discharged into platinum crucibles. The crucibles were moved into a furnace operating at about 1625°C. and the batches melted overnight (~ 16 hours). the melts were stirred slowly, poured and squeezed through stainless steel rollers to produce glass patties having a width of about 10–15 cm, a length of about 25 cm, and a thickness of 1.5 cm, and those patties were annealed at 700°C. The annealed patties were cut into shapes suitable for testing purposes.

It will be appreciated that the above glass melting and forming processes reflect laboratory practice only. Stated in another way, the above glasses are capable of being melted and formed utilizing commercial, large scale glass melting and forming equipment, and are not limited to laboratory activity. Furthermore, although the compositions of Table I were annealed to room temperature to permit examination of glass quality and to cut test samples from the patties, that action is not required. It is only necessary that the batches be heated sufficiently to produce a homogeneous melt, that melt cooled to a temperature below the transformation range thereof to yield an essentially crystal-free glass, and that glass body then subjected to the nucleation-crystallization heat treatment to convert it into a glass-ceramic.

Table II reports approximate heat treatment schedules which were employed with the glass samples of Table I along with the linear coefficient of thermal expansion (Exp) as measured over the temperature range of 0°–300°C. in terms of $\times 10^{-7}/°C.$, and the x and y color coordinates with tristimulus value Y utilizing Illuminant C. Temperatures are listed in °C. and time in hours (hr).

TABLE II

| Ex. | Heat Treatment | Exp | x | y | Y |
|---|---|---|---|---|---|
| 1 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | — | 0.3212 | 0.3315 | 88.22 |
| 2 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | — | 0.3253 | 0.3333 | 85.04 |
| 3 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | — | 0.3253 | 0.3342 | 83.64 |
| 4 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 11.5 | 0.3268 | 0.3353 | 79.66 |
| 5 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 11.9 | 0.3286 | 0.3376 | 79.0 |
| 6 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 12.1 | 0.3306 | 0.3398 | 78.46 |
| 7 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 12.3 | 0.3335 | 0.3428 | 76.77 |
| 8 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 11.1 | 0.3336 | 0.3430 | 74.58 |
| 9 | 25–700 at 1000/hr<br>700–820 at 265/hr<br>820–850 at 30/hr<br>850–1100 at 240/hr<br>1100 for 1 hr<br>1100–950 at 400/hr<br>950–25 at 2500/hr | 12.0 | 0.3368 | 0.3462 | 73.13 |
| 10 | 25–800 at 800/hr<br>800–830 at 36/hr<br>830–1070 at 240/hr<br>1070–1080 at 15/hr<br>1080–25 at 1050/hr | 11.5 | 0.3323 | 0.3376 | 63.5 |
| 11 | 25–700 at 1000/hr<br>700–800 at 215/hr<br>800–835 at 30/hr<br>835–1100 at 230/hr<br>1100 for 1 hr<br>1100–950 at 400/hr<br>950–25 at 2500/hr | 13.1 | 0.3306 | 0.3377 | 77.97 |

As can be seen from Table II, although no express dwell period within the nucleation range was employed, the rate of temperature increase through the 750°-850°C. range was controlled such that the samples were within that temperature interval for about 1.25 hours. Longer times within the nucleation range can be used without concern with the samples to achieve even greater nucleation, but are unnecessary and are uneconomical from a practical point of view, inasmuch as sufficient nucleation was generated within that period to assure the extensive growth of uniformly-sized, very fine-grained crystals. Hence, exposure periods of about 1–3 hours have been deemed satisfactory.

At temperatures below about 1025°C., growth of crystals is quite slow. On the other hand, crystallization temperatures in excess of about 1175°C. can lead to grain growth of the crystals and thermal deformation of the body. It will be appreciated that, with articles of similar physical dimensions, longer exposure periods to assure the development of a high level of crystallinity will be required at lower temperatures within the crystallization range than at temperatures at the upper extreme thereof. Whereas in the heat treatment schedules listed in Table II the samples remained within the crystallization range for about 1–1.25 hours, longer exposure periods can be utilized without concern, but such longer periods can be uneconomical from a practical point of view in like manner to very extended nucleation periods. Accordingly, crystallization heat treatments of about 1–4 hours have been considered sufficient to achieve the desired extensive growth of uniformly-sized, very fine-grained crystals.

The x and y coordinates for Examples 1–11 are positioned within polygon bounded by Points A'B'C'D'E'F'A', which polygon overlaps the plot of the x and y coordinates encompassed with polygon bounded by Points ABCDEFA and, hence, includes tints not only matching that of CORNERSTONE® tableware, but also hues close to and compatible therewith. As is evident from polygon A'B'C'D'E'F'A', the tints of Examples 1–4, containing $CeO_2$ concentrations of 0.5%, 0.75%, 1%, and 1.25%, respectively, fall outside of the desired values, and Example 5, containing 1.5% $CeO_2$, is at the edge of acceptable color. Accordingly, 1.5% $CeO_2$ has been deemed a practical minimum limit. At the other extreme, Example 9, containing 2.5% $CeO_2$ is close to the edge of acceptable color and Example 9, containing 3% $CeO_2$ is outside of acceptable color. Therefore, 2.75% $CeO_2$ has been adjudged an appropriate maximum level, with 1.75–2.25% $CeO_2$ being the preferred range.

To further illustrate the singular behavior of $CeO_2$ in imparting a beige tint close to and compatible with the hue of CORNERSTONE® tableware, $CeO_2$ was substituted for $SiO_2$ in amounts of 1.5%, 2.0%, and 2.5% in the base composition of the CORNERSTONE® tableware. The batches were compounded, ballmilled, melted at 1550° C., poured into 6"×6"×½" steel molds, and annealed at 600° C. in like manner to the procedure described in Patent No. 4,331,769. The compositions of those three glasses are recorded below in Table III, expressed in terms of parts by weight on the oxide basis as calculated from the batch. Because the sum of the individual constituents closely approximates 100, for all practical purposes the tabulated values may be deemed to reflect weight percent.

TABLE III

|  | 12 | 13 | 14 |
| --- | --- | --- | --- |
| $SiO_2$ | 62.9 | 62.4 | 61.7 |
| $Al_2O_3$ | 6.28 | 6.28 | 6.31 |
| $Na_2O$ | 3.04 | 3.04 | 3.05 |
| $B_2O_3$ | 4.86 | 4.86 | 4.89 |
| CaO | 15.2 | 15.2 | 15.3 |
| MgO | 1.01 | 1.01 | 1.01 |
| $K_aO$ | 3.04 | 3.04 | 3.05 |
| F | 3.55 | 3.55 | 3.56 |
| $CeO_2$ | 1.50 | 2.0 | 2.51 |

The x and y color coordinates tristimulus values Y (Illuminant C) for those three glasses were measured as follows:

| Glass 12 | x = 0.3201, y = 0.3282, Y = 77.0 |
| --- | --- |
| Glass 13 | x = 0.3213, y = 0.3281, Y = 72.5 |
| Glass 14 | x = 0.3282, y = 0.3342, Y = 67.9 |

As is immediately evident, those values fall far outside of polygon A'B'C'D'E'F'A' and, hence, the hues would not be compatible with the tint of CORNERSTONE® tableware.

The more preferred composition intervals yielding tints not only closely matching that of CORNERSTONE® tableware, but also exhibiting physical and chemical properties rendering them exceptionally suitable for culinary ware, consist essentially, expressed in terms of weight percent on the oxide basis, of

| $SiO_2$ | 68.0 ± 2.0 | $TiO_2$ | 4.5 ± 0.75 |
| --- | --- | --- | --- |
| $Al_2O_3$ | 18.0 ± 1.5 | $CeO_2$ | 2.0 ± 0.25 |
| $Li_2O$ | 2.75 ± 0.5 | $As_2O_3$ | 0.75 ± 0.5 |
| MgO | 2.5 ± 0.75 | F | 0.5 ± 0.48 |
| ZnO | 1.0 ± 0.25 | $ZrO_2$ | 0 – 0.5 |
| $Na_2O$ | 0.5 ± 0.25 | | |

Example 10 is considered to be the most preferred composition.

We claim:

1. A beige-tinted, opaque glass-ceramic article containing β-spodumene solid solution as the predominant crystal phase with minor amounts of rutile, spinel, loparite, and perrierite which exhibits a linear coefficient of thermal expansion (0°–300°C.) less than $15 \times 10^{-7}/°C.$ and x and y color coordinates (Illuminant C) coming within polygon bounded by Points A'B'C'D'E'F'A' of the drawing, said glass-ceramic having a composition consisting essentially, expressed in terms of weight percent on the oxide basis, of

| $SiO_2$ | 66–70 | $TiO_2$ | 3.5–5.5 |
| --- | --- | --- | --- |
| $Al_2O_3$ | 16.5–19.5 | $CeO_2$ | 1.5–2.75 |
| $Li_2O$ | 2–4 | $As_2O_3$ | 0–1.5 |
| MgO | 1–5 | F | 0–1.2 |
| ZnO | 0.5–2 | $ZrO_2$ | 0–2.5 |
| $Na_2O$ | 0–1 | | |

2. A glass-ceramic article according to claim 1 consisting essentially, in weight percent, of

| $SiO_2$ | 68.0 ± 2.0 | $TiO_2$ | 4.5 ± 0.75 |
| --- | --- | --- | --- |
| $Al_2O_3$ | 18.0 ± 1.5 | $CeO_2$ | 2.0 ± 0.25 |
| $Li_2O$ | 2.75 ± 0.5 | $As_2O_3$ | 0.75± 0.5 |
| MgO | 2.5 ± 0.5 | F | 0.5 ± 0.48 |
| ZnO | 1.0 ± 0.25 | $ZrO_2$ | 0 – 0.5 |
| $Na_2O$ | 0.5 ± 0.25 | | |

* * * * *